United States Patent [19]

Wu et al.

[11] Patent Number: 5,579,387
[45] Date of Patent: Nov. 26, 1996

[54] APPARATUS FOR ACCESSING FUNCTION CODE IN TELEPHONE

[75] Inventors: Jui-Kuang Wu; Mao-Sung Chen; Meng-Tsang Wu, all of Hsinchu, Taiwan

[73] Assignee: Winbond Electronics Corporation, Hsin-Chu, Taiwan

[21] Appl. No.: 268,839

[22] Filed: Jun. 30, 1994

[51] Int. Cl.⁶ .................................................. H04J 3/12
[52] U.S. Cl. ........................ 379/387; 379/280; 379/283
[58] Field of Search ................................. 379/387, 280, 379/283, 284, 285, 286, 201, 202, 215, 216; 364/486, 569

[56] References Cited

U.S. PATENT DOCUMENTS 4,860,230  8/1989  Sallaerts et al. .................... 379/286
4,924,501  5/1990  Cheeseman et al. ................ 379/286
5,327,488  7/1994  Garland ................................. 379/215

Primary Examiner—Krista M. Zele
Assistant Examiner—Jacques M. Saint-Surin
Attorney, Agent, or Firm—Knobbe, Martens, Olson & Bear

[57] ABSTRACT

An apparatus adapted to be activated by an input device for accessing a function code in a telephone comprises a first memory for storing a function code, a second memory electrically connected to the first memory for storing a datum corresponding to the function code, and an address decoder electrically connected to the input device and the second memory for decoding a signal generated from the input device and designating thereby an address to access at least one of the function code and the datum, wherein the function code stored in the first memory and the datum stored in the second memory are accessible by same the address. This apparatus effectively reduces the number of the keys required on a keypad of a telephone and is provided for a simplified operation.

20 Claims, 1 Drawing Sheet

APPARATUS FOR ACCESSING FUNCTION CODE IN TELEPHONE

FIELD OF THE INVENTION

This invention generally relates to an apparatus for accessing a function code in telephone.

BACKGROUND OF THE INVENTION

In most countries in Europe or America, the telephone company offers telephone users some special services, such as three-way calling, call waiting, etc. A telephone, by combining therewith an apparatus storing therein some function codes and some data corresponding to those function codes for accessing a function code, can be used for proceeding the special service.

Prior apparatuses capable of performing the similar function are various from one another in the market, dependent on by which company the apparatus was fabricated. Generally speaking, in the prior apparatus, the function codes and the data corresponding to the function codes are respectively accessed by pressing different keys. For example, suppose a call diverting service should be activated by a combination code of *A7654321#, wherein "*A", an initial code, and "#", a tail code, are both for requesting the call diverting service, and "7654321" is the desired phone number, e.g. a phone number in the user's office, a phone call should be automatically connected to, when there is a phone call directed to a phone number, e.g. a phone number at user's home, nobody will answer during a specific period of time, e.g. at work time. Due to the fact that each of the initial code, e.g. *A, the desired phone number, e.g. 7654321, and the tail code, e.g. #, is accessible by an individual key on the key pad of the telephone, the user has to accordingly press a first key for initiating the initial code, a second key for initiating the desired phone number, and a third key for initiating the tail code.

Therefore, the shortages of the prior apparatus are as follows:

1. Much more keys on the keypad of the telephone are required to perform the same amount of the services due to the fact that one key can only initiate one function code or one telephone number to be proceeded;
2. Many troubles or inconveniences are existing to affect the operation of the telephone because the function codes and the data of the phone numbers stored in RAM are prone to get lost when the input electrical voltage is too low or the telephone set is turned off, or are easily re-entered and changed by another user unintentionally; and
3. Big burdens are imposed to a user to memorize all informations required for operating the keys on the keypad.

SUMMARY OF THE INVENTION

An object of the present invention is to provide an apparatus to let a telephone set be capable of requiring less number of keys.

Another object of the present invention is to provide an apparatus to let a telephone set keep all function codes to be safely stored in the memory from an unintentional elimination.

Another object of the present invention is to provide an apparatus to let a telephone set be operated friendly and easily.

An apparatus adapted to be activated by an input device for accessing a function code in a telephone according to the present invention comprises a first memory for storing a function code, a second memory electrically connected to the first memory for storing a datum corresponding to the function code, and an address decoder electrically connected to the input device and the second memory for decoding a signal generated from the input device and designating thereby an address to access at least one of the function code and the datum, wherein the function code stored in the first memory and the datum stored in the second memory are accessible by same the address.

In accordance with another aspect of the present invention, the apparatus further comprises a switch electrically connected to the first and second memories for selectively accessing one of the function code stored in the first memory and the datum stored in the second memory.

In accordance with another aspect of the present invention, the apparatus further comprises a detector electrically connected to the switch for enabling the first memory to output the function code at a desired condition.

In accordance with another aspect of the present invention, wherein the detector is a data-loss detector and the desired condition occurs when the detector detects the datum corresponding to the decoded address has a loss.

In accordance with another aspect of the present invention, wherein the detector is a low power detector and the desired condition occurs when there is a voltage drop in the telephone.

In accordance with another aspect of the present invention, the apparatus further comprises a signal generator electrically connected to the switch for providing a flag representing a condition whether the datum corresponding to the decoded address is stored in the second memory.

In accordance with another aspect of the present invention, wherein the signal generator controls the switch to enable the second memory to output the datum when the second memory stores thereto the datum.

In accordance with another aspect of the present invention, wherein the signal generator control the switch to enable the first memory to output the function code when the second memory does not store therein the datum.

In accordance with another aspect of the present invention, wherein the signal generator is a flag generator.

In accordance with another aspect of the present invention, wherein the input device is a keypad.

In accordance with another aspect of the present invention, wherein the keypad includes a function key, a service key, or a combination thereof.

In accordance with another aspect of the present invention, wherein the keypad includes a function key.

In accordance with another aspect of the present invention, wherein the keypad further includes a service key.

In accordance with another aspect of the present invention, wherein the switch enables the first memory to output the function code when the service key and the function key are pressed.

In accordance with another aspect of the present invention, wherein the first memory is a ROM, an EPROM, or an EEPROM, and further includes a ROM, an EPROM, or an EEPROM.

In accordance with another aspect of the present invention, wherein the second memory is a RAM, an SRAM, an EPROM, or an EEPROM.

In accordance with another aspect of the present invention, wherein the datum includes a telephone number or a time value.

In accordance with another aspect of the present invention, wherein the function code is to be outputted to perform a function selected from a group consisting of ting back, reminder call, three-way calling, call diverting, and call waiting.

In accordance with another aspect of the present invention, the apparatus further comprises a bus electrically connected to the first and second memories for transmitting therethrough the datum or the function code.

In accordance with another aspect of the present invention, the apparatus further comprises an output device electrically connected to the bus for outputting therefrom the datum or the function code.

In accordance with another aspect of the present invention, wherein the output device is a tone/pulse generator capable of outputting therefrom a tone signal or a pulse signal.

The present invention may be best understood through the following description with reference to the accompanying drawings, in which:

DETAILED DESCRIPTION OF THE PREFERRED EMBODIMENT

Figure 1:
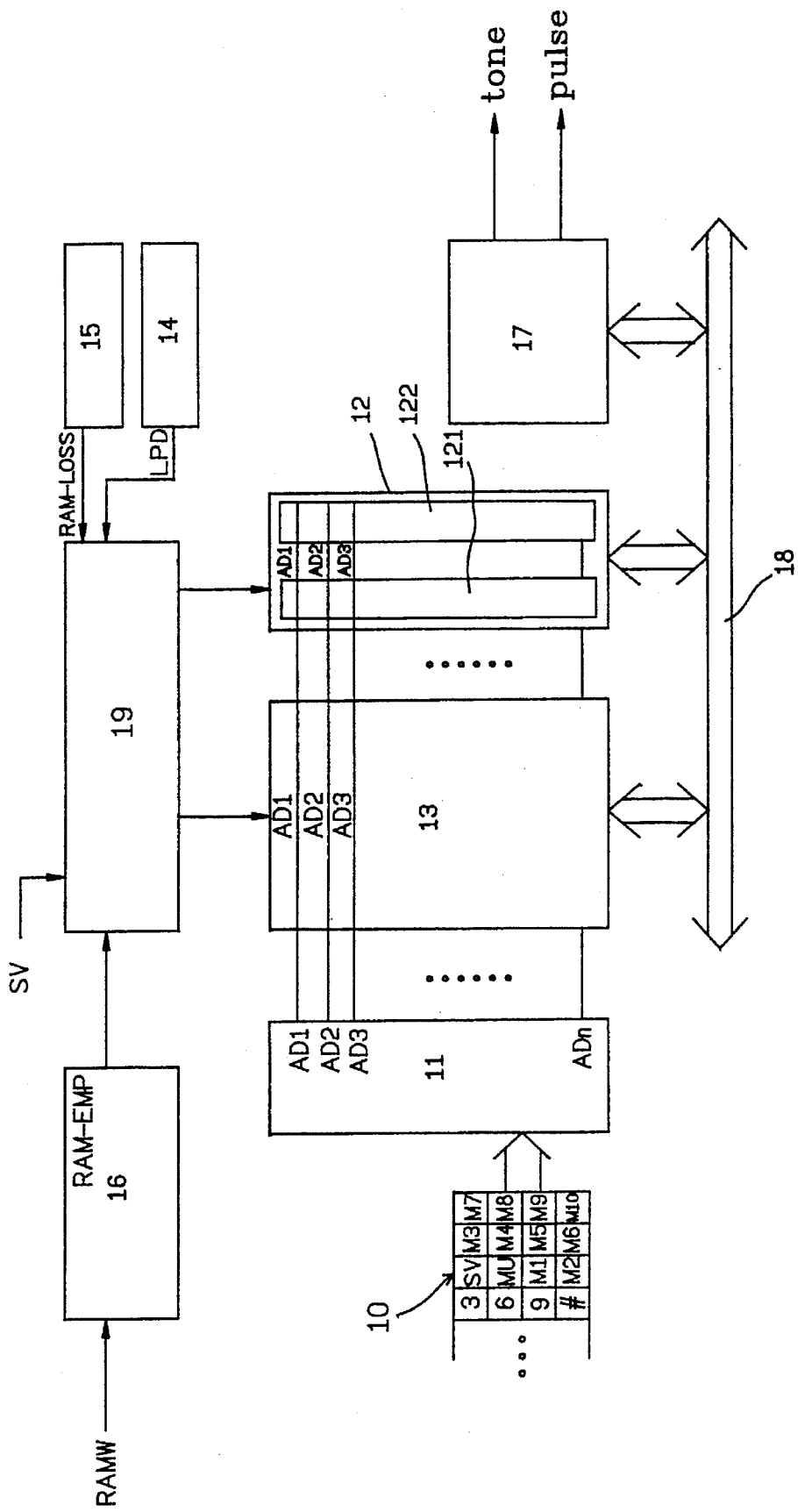
FIG. 1 is a schematic block diagram of a preferred embodiment of an apparatus according to this invention.

An apparatus according to this invention, as shown in FIG. 1, comprises a keypad 10 having thereon plural of function keys SV, MU, M1–M9, a first memory 12 including therein a first ROM 121 for storing at least one initial code, hereinafter called Code11, and a second ROM 122 for storing at least one tail code, hereinafter called Code12, a second memory 13, e.g. a RAM, storing therein some data No1, which is always a series of numbers, corresponding to Code11 and Code12, an address decoder electrically connected to the keypad 10, ROMs 121 and 122, and RAM 13, for decoding a signal generated from the keypad 10 and designating thereby an address to access Code11, Code12, or the data No1, a switch 19 electrically connected to ROMs 121 and 122 and RAM 13 for selectively accessing either function codes Code11, Code12, or data No1, a low power detector 14 electrically connected to the switch 19 for enabling the first memory ROM 121 or 122 to output the function code Code11 or Code12 if an input voltage being lower than a specific value is detected, a data-loss detector 15 electrically connected to the switch 19 for detecting if data No1 has a loss, a flag generator 16, or called data empty flag generator 16, electrically connected to the switch 19 for providing a flag, i.e. an empty flag if RAM 13 does not store the data No1 or an occupied flag if RAM 13 does store the data No1, and controlling the switch 19 to enable the RAM 13 to output the data No1 or to enable the ROM 121 or 122 to output the function code Code11 or Code12, a bus 18 electrically connected to the RAM 13 and ROMs 121 and 122 for receiving and transmitting therethrough the data No1 or the function code Code11 or Code12, and a tone/pulse generator 17 electrically connected to the bus 18 for receiving and outputting what the bus 18 transmits.

This invention features in that Code11, Code12, and No1 share and lie in the same address line AD1 so that they can be initiated by the same function key, e.g. an M1 key. Sometimes a function is proceeded by way of further pressing a service key, hereinafter designated as SV key on the keypad 10. The detailed descriptions of the preferred embodiments of this invention categorized into four parts will be respectively depicted as follows.

It is to be noted that the following descriptions including preferred embodiments of this invention are presented herein for purpose of illustration and description only; it is not intended to be exhaustive or to be limited to the precise form disclosed.

Rule 1:

When the telephone and the apparatus for accessing a function code therein are newly powered on so that there is an empty data, i.e. no data, stored in RAM 13, or when the input voltage is lowered down to a critical value such that the data stored in RAM 13 is thus lost, if a user presses the M1 key, the switch 19 will enable ROM 121 or 122 to send out Code11 or Code12 corresponding to AD1, rather than enable RAM 13 to send out the data corresponding to AD1, through bus 18 to the tone/pulse generator 17 to further be outputted to the phone company. The decision of sending out which one of Code11 and Code12 depends on whether the Code11 was ever sent out or not, i.e. if Code11 was never sent out, then Code11 will be sent out, or if Code11 was already sent out once, then Code12 will be sent out.

Rule 2:

If the data stored in RAM 13 is lost or anomalously vaned when suffering some special adverse affects, such as the influence of the static electricity and the M1 key is pressed, the switch 19 will enable ROM 121 or 122 to send out Code11 or Code12 corresponding to AD1 to bus 18.

Rule 3:

If there is an empty data in RAM 13 and the M1 key is pressed, the switch 19 will enable ROM 121 or 122 to send out Code11 or Code12 corresponding to AD1 to bus 18. Otherwise, if there is a data, e.g. No1 corresponding to address AD1, stored in RAM 13 through a normal process and the M1 key is pressed, the switch 19 will enable RAM 13 to send out data No1.

Rule 4:

One of the keys on the keypad 10 is a service key, i.e. an SV key, which can be used in combination with another function key such as the M1 key to perform other functions. By pressing the SV key it will force the function code stored in ROM 121 or 122 to be outputted. For example, if the SV key and the M1 key are consecutively pressed, the switch 19 will enable ROM 121 or 122 to output Code11 or Code12. If only the M1 key is pressed and the data No1 is normally stored in RAM 13, the data No1 will be sent out.

The above-mentioned four rules will now be further described in detail with reference to the block diagram shown in FIG. 1.

The function of the low power detector 14 in the apparatus is that, if the voltage value of the telephone lowers down to a critical value so that the data stored in RAM 13 will be possibly lost, the low power detector will give an LPD signal to notify the switch 19 to set its output destination to be ROM 12. The function of the data-loss detector 15 is to detect whether there is a loss of data stored in RAM 13; if so, the data-loss detector 15 will give a RAM-Loss signal to notify the switch 19 to set its output destination to be ROM 12. The function of the flag generator 16 is to provide a flag showing a storing status of RAM 13. If there is a data stored in RAM 13, RAM 13 will generate a RAMW signal to notify the flag generator 16 to set the flag, which is specified hereinafter as a RAM-EMP flag, as "0", otherwise, as "1". According to the RAM-EMP flag provided thereto, the flag generator 16 will further give a RAM-EMP signal to notify the switch 19 the storing status of RAM 13. If the switch 19 is notified that an empty data is stored in RAM 13, it will set its output destination to be ROM 12; otherwise, to be RAM 13.

When a user merely presses a function key, e.g. the M1 key, a dial signal is thereby sent to the address decoder 11. According to the dial signal sent thereto, the address decoder 11 will designate an address line, e.g. AD1, corresponding to the respective data in and electrically connected to the respective address lines AD1 in both RAM 13 and ROM 12. If the switch 19 is notified by the flag generator 16 that the data stored in RAM 13 and corresponding to AD1 is not an empty data, the low power detector 14 detects a normal voltage value without any occurrence of a voltage drop, and the data-loss detector 15 detects a normal storing status of RAM 13 storing therein the data No1, then the data No1 stored in RAM 13 and corresponding to AD1 will be sent out through bus 18 to a tone/pulse generator 17 to be outputted in either a tone or pulse mode. These establish one operation condition based on the first to the third rules mentioned above.

Furthermore, if a function code, e.g. Code11 or Code12 is going to be forced to be accessed, as described in Rule 4, a user has to take step of pressing a service key, e.g. a SV key, in advance, followed by pressing the function key, e.g. an M1 key.

Therefore, if a whole special service function code, e.g. *A7654321#, is going to be accessed to the telephone company for requesting a call diverting service, wherein "*A", "7654321", and "#" are defined the same as before and "*A" is corresponding to AD1 and stored as Code11 in ROM 121, "7654321" is corresponding to AD1 and stored as No1 in RAM 13, and "#" is stored as Code12 in ROM 122 and corresponding to AD1, the user can consecutively press SV and M1 keys for initializing the initial code "*A", an M1 key for initializing the output of the phone number "7654321", and SV and M1 keys for initializing the tail code "#". The special service of call diverting is thus obtained. The keys to be pressed are SV, M1, M1, SV, and M1 accordingly. During these steps, only two keys, that is, an SV key and an M1 key, are required to be pressed.

Another example of the special service function is the requesting for a reminder call service. A time value, e.g. 1400 which represents a time of 2:00 pm, is stored as a data No2 corresponding to the address line AD2 in RAM 13, an initial code of "*B", which represents for requesting a reminder call service, is stored as Code21 corresponding to the address line AD2 in ROM 121, and a tail code of "#", which represents for requesting a reminder call service, is stored as Code22 corresponding to the address line AD2 in ROM 122. One of Code21, Code22, and No2 will be accessed by pressing a function key M2 because they share and lie in the same but respective address lines AD2. The requesting for the reminder call service is performed by sequentially pressing SV, M2, M2, SV, and M2.

A user can also take similar steps to perform the aforementioned requesting procedure without pressing the SV key. The user can store an empty data, which is the data No1, corresponding to the address line AD1 in RAM 13 and a data No2, i.e. the phone number "7654321", corresponding to the address line AD2 in RAM 13. The address decoder 11 will decode a signal generated from key M1 and designate an address of AD1 to access the code of one of No1, Code11, and Code12, or will decode a signal generated from key M2 and designate an address of AD2 to access the code of one of No2, Code21, and Code22. Now, if the initial code "*A" is stored as Code11 in ROM 13, the tail code "#" is stored as Code12 in ROM 13, an empty data is stored as No1 in RAM 13, and the phone number "7654321" is stored as No2 in RAM 13, the user can sequentially press M1, M2, and M1 to initiate a whole code of "*A7654321#" to request a call diverting service. We can easily see that only two keys, i.e. M1 and M2 keys, are required to be pressed. The reason is that, due to the fact that the data No1 is an empty data, when the M1 key is pressed at the first time, the switch 19 will enable ROM 121 to send out the function code Code11, i.e. "*A", rather than enable ROM 122 or RAM 13 to send out Code12 or No1 respectively. When the M2 key is pressed, the switch 19 surely will enable RAM 13 to send out the data No2, i.e. "7654321". When the M1 key is pressed at the second time, the switch 19 will enable ROM 122 to send out Code12, i.e. "#". This strategy provides another option to perform the same function. Of course, there are still other strategies not revealed here for consideration by the user. Various strategies capable of being considered and adopted by the user are decided by and depend on each user's convenience, habit, and the understanding and the talent of the user to the application of Permutation and Combination.

It is concluded that this invention utilizing a RAM 13 for storing therein a data and two ROMs 121 and 122 for respectively storing therein two function codes, wherein the data and two function codes are corresponding to the same but respective address lines which are designated by the address decoder 11 by which a dial signal generated from the keypad 10 is decoded, has the advantages summarized as follows.

1. The function codes stored in ROM will not lose or be eliminated by the disconnection between the telephone set and the power supply. In addition, the function codes are usually fixed in a country and will not possibly be changed frequently. This invention can effectively prevent a user from a worry of repeatedly inputting the same function codes each time after the power of the telephone is off and turned on.

2. Each operation for requesting a special service requires only two keys to be pressed according to this invention whereas the prior apparatus requires three keys to be pressed to perform the same function. For two telephone sets having the same number of the keys on the keypad, the one according to this invention can offer much more functions than the prior one does. For example, if there are 9 keys on the keypad for each telephone set, there are at most three functions can be proceeded by the prior one while there are at least four functions can be done by the one according to this invention. If each service can be initiated by pressing the keys including a service key and a function key, then there can be 8 function keys and one service key on the keypad of a telephone so that there will be 8 functions capable of being accessed thereby according to this invention.

3. This invention offers versatile and simple operation modes to satisfy the requirements of all the users. A user can select to use a procedure by pressing a service key to force a function code to be outputted or by storing an empty data corresponding to an address line in RAM to automatically convert the switch to retrieve the function code stored corresponding to the same address line in ROM when a key corresponding to the same address line is pressed. Both procedures are available for a user who has his/her own preference to set the function and record any data for a key on the keypad of a telephone.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A telephone system incorporating therein a memory accessing apparatus, said system comprising:
    a telephone;
    an input device communicating with said telephone for generating a signal;
    a first memory for storing a function code;
    a second memory electrically connected to said first memory for storing a datum corresponding to said function code; and
    an address decoder electrically connected to said input device and said second memory for decoding said signal generated from said input device and designating thereby an address to access at least one of said function code and said datum, wherein said function code stored in said first memory and said datum stored in said second memory are accessible by same said address.

2. An apparatus as claimed in claim 1, further comprising a switch electrically connected to said first and second memories for selectively accessing one of said function code stored in said first memory and said datum stored in said second memory.

3. An apparatus as claimed in claim 2, further comprising a detector electrically connected to said switch for enabling said first memory to output said function code at a desired condition.

4. An apparatus as claimed in claim 3, wherein said detector is a data-loss detector and said desired condition occurs when said detector detects said datum corresponding to said decoded address has a loss.

5. An apparatus as claimed in claim 3, wherein said detector is a low power detector and said desired condition occurs when there is a voltage drop in said telephone.

6. An apparatus as claimed in claim 2, further comprising a signal generator electrically connected to said switch for providing therein a flag representing a condition whether said datum corresponding to said decoded address is stored in said second memory.

7. An apparatus as claimed in claim 6, wherein said signal generator controls said switch to enable said second memory to output said datum when said second memory stores therein said datum.

8. An apparatus as claimed in claim 6, wherein said signal generator controls said switch to enable said first memory to output said function code when said second memory does not store therein said datum.

9. An apparatus as claimed in claim 6, wherein said signal generator is a flag generator.

10. An apparatus as claimed in claim 2, wherein said input device is a keypad.

11. An apparatus as claimed in claim 10, wherein said keypad includes one selected from a group consisting of a function key, a service key, and a combination thereof.

12. An apparatus as claimed in claim 11, wherein said switch enables said first memory to output said function code when said service key and said function key are pressed.

13. An apparatus as claimed in claim 1, wherein said first memory is one selected from a group consisting of a ROM, an EPROM, and an EEPROM.

14. An apparatus as claimed in claim 13, wherein said first memory further includes one selected from a group consisting of a ROM, an EPROM, and an EEPROM.

15. An apparatus as claimed in claim 1, wherein said second memory is one selected from a group consisting of a RAM, an SRAM, an EPROM, and an EEPROM.

16. An apparatus as claimed in claim 1, wherein said datum includes one selected from a group consisting of a telephone number and a time value.

17. An apparatus as claimed in claim 1, wherein said function code is to be outputted to perform a function selected from a group consisting of ring back, reminder call, three-way calling, call diverting, and call waiting.

18. An apparatus as claimed in claim 1, further comprising a bus electrically connected to said first and second memories for transmitting therethrough one selected from a group consisting of said datum and said function code.

19. An apparatus as claimed in claim 18, further comprising an output device electrically connected to said bus for outputting therefrom one selected from a group consisting of said datum and said function code.

20. An apparatus as claimed in claim 19, wherein said output device outputs a signal selected from a group consisting of a tone signal and a pulse signal.

* * * * *